(12) United States Patent
Santangelo, III

(10) Patent No.: US 12,723,618 B1
(45) Date of Patent: Sep. 1, 2026

(54) PIVOTAL CONNECTION WITH THE ABILITY TO ACHIEVE FULL ROTATIONAL POSITIONING

(71) Applicant: Frank Santangelo, III, Orange, CA (US)

(72) Inventor: Frank Santangelo, III, Orange, CA (US)

( * ) Notice: Subject to any disclaimer, the term of this patent is extended or adjusted under 35 U.S.C. 154(b) by 108 days.

(21) Appl. No.: 18/945,067

(22) Filed: Nov. 12, 2024

Related U.S. Application Data

(63) Continuation of application No. 17/570,322, filed on Jan. 6, 2022, now Pat. No. 12,140,178.

(51) Int. Cl.
*F16C 11/10* (2006.01)
*A45B 17/00* (2006.01)

(52) U.S. Cl.
CPC ............. *F16C 11/106* (2013.01); *A45B 17/00* (2013.01); *Y10T 403/32311* (2015.01)

(58) Field of Classification Search
CPC ..... F16C 11/0652; F16C 11/069; F16C 11/10; F16C 11/103; F16C 11/106; Y10T 403/32254; Y10T 403/32262; Y10T 403/32311; Y10T 403/32319; Y10T 403/32327; Y10T 403/32336; Y10T 403/32557; Y10T 403/32565; Y10T 403/32713; Y10T 403/32811;
(Continued)

(56) References Cited

U.S. PATENT DOCUMENTS 3,311,119 A * 3/1967 Pearlstine .............. A45B 17/00 135/20.3
3,568,963 A * 3/1971 Koskinen ............... A45B 17/00 403/68

(Continued)

FOREIGN PATENT DOCUMENTS

KR 20140104188 A * 8/2014 ......... E04H 12/2284

*Primary Examiner* — Amber R Anderson
*Assistant Examiner* — Kevin J Baynes
(74) *Attorney, Agent, or Firm* — The Law Office of Austin Bonderer, PC; Austin Bonderer

(57) ABSTRACT

A joint having a base portion, an upper portion, and an actuation portion. The base portion defines a socket. The upper portion has a spherical element at least partially located inside the socket, and the spherical element defines a locking portion. The actuation portion is at least partially located inside the base portion. The actuation portion has a button, a button spring, a pin, a pin spring. The button defines a pin receiving space. The pin has a pin projection, and the pin extends through the pin receiving space. The button is configured to move between a locked position, in which the pin is prevented from moving in an actuation direction, and an actuation position, in which the pin is capable of at least some movement in the actuation direction. The button spring biases the button to the locked position, and the pin spring biases the pin toward the spherical element and abuts the locking portion. In the actuation position, the upper portion is able to move within the socket while the pin projection abuts the spherical element, and the pin is able to move in the actuation direction. In the locked position, the button prevents the pin from moving in the actuation direction, and the pin projection is located inside the locking portion.

16 Claims, 10 Drawing Sheets

(58) Field of Classification Search
CPC .............. A45B 17/00; A45B 2017/005; B25B 23/0028; B25B 23/16; B25G 3/38; F16M 11/14
See application file for complete search history.

(56) References Cited

U.S. PATENT DOCUMENTS

| | | | | | |
|---|---|---|---|---|---|
| 5,086,797 | A * | 2/1992 | Earnshaw | A45B 17/00 135/20.1 |
| 5,280,871 | A * | 1/1994 | Chuang | A45B 17/00 248/516 |
| 5,590,673 | A * | 1/1997 | Earnshaw | A45B 17/00 135/20.1 |
| 6,000,302 | A * | 12/1999 | Chiang | B25G 1/063 81/177.8 |
| 6,216,317 | B1 * | 4/2001 | Chen | B25G 1/063 403/84 |
| 6,216,567 | B1 * | 4/2001 | Hu | B25G 1/063 81/177.9 |
| 6,364,562 | B1 * | 4/2002 | Tung | A45B 17/00 403/96 |
| 6,575,183 | B2 * | 6/2003 | Tung | A45B 25/14 135/98 |
| 7,028,699 | B2 * | 4/2006 | Lee | A45B 17/00 464/106 |
| 7,401,538 | B2 * | 7/2008 | Cheng | B25G 1/063 81/177.85 |
| 8,671,809 | B1 * | 3/2014 | Chen | B25B 23/00 81/177.8 |
| 9,221,157 | B1 * | 12/2015 | Chen | B25B 13/481 |
| 9,242,366 | B2 * | 1/2016 | Liu | B25G 1/066 |
| 9,615,636 | B2 * | 4/2017 | Harrison | F16M 11/2078 |
| 9,644,385 | B2 * | 5/2017 | Ngu | E04H 12/2238 |
| 9,949,540 | B2 * | 4/2018 | Gharabegian | G05B 15/02 |
| 10,078,856 | B2 * | 9/2018 | Gharabegian | H04N 7/181 |
| 10,159,316 | B2 * | 12/2018 | Gharabegian | H02S 30/20 |
| 10,250,817 | B2 * | 4/2019 | Gharabegian | A45B 23/00 |
| 10,455,395 | B2 * | 10/2019 | Gharabegian | H05B 45/00 |
| 10,542,799 | B2 * | 1/2020 | Gharabegian | A45B 25/143 |
| 10,565,631 | B2 * | 2/2020 | Gharabegian | G06F 3/04883 |
| 10,650,423 | B2 * | 5/2020 | Gharabegian | G06F 3/04847 |
| 10,813,422 | B2 * | 10/2020 | Gharabegian | A45B 25/18 |
| 10,813,424 | B2 * | 10/2020 | Gharabegian | H02S 20/32 |
| 10,819,916 | B2 * | 10/2020 | Gharabegian | A45B 25/143 |
| 10,912,357 | B2 * | 2/2021 | Gharabegian | A45B 23/00 |
| 2002/0176736 | A1 * | 11/2002 | Tsou | F16C 11/103 403/103 |
| 2008/0105289 | A1 * | 5/2008 | Ma | A45B 17/00 135/20.1 |
| 2011/0072941 | A1 * | 3/2011 | Tsai | B25G 1/063 81/177.8 |
| 2012/0048316 | A1 * | 3/2012 | Fournillier | A45B 17/00 135/16 |
| 2021/0042802 | A1 * | 2/2021 | Gharabegian | H02S 40/32 |

* cited by examiner

PIVOTAL CONNECTION WITH THE ABILITY TO ACHIEVE FULL ROTATIONAL POSITIONING

BACKGROUND

One aspect of the disclosure is about umbrellas inserted into a medium, such as sand and dirt. Often, umbrellas can tilt from a pivot point, and users adjust the umbrella when inserting it into the medium to block the sun. However, the sun moves, and an adjustment must be made. During these adjustments, the pole that is inserted into the medium must be rotated. This rotation often unseats the pole resulting in an unstable umbrella, and it often requires creating a different hole. This proves to be time-consuming and frustrating. Also, often in the environments in which these umbrellas are used, the wind is a factor, and joints must be able to resist forces created by the umbrella and the wind.

BRIEF DESCRIPTION OF THE DRAWINGS

Implementations of the present technology will now be described, by way of example only, with reference to the attached figures, wherein.

DETAILED DESCRIPTION

Figure 1:
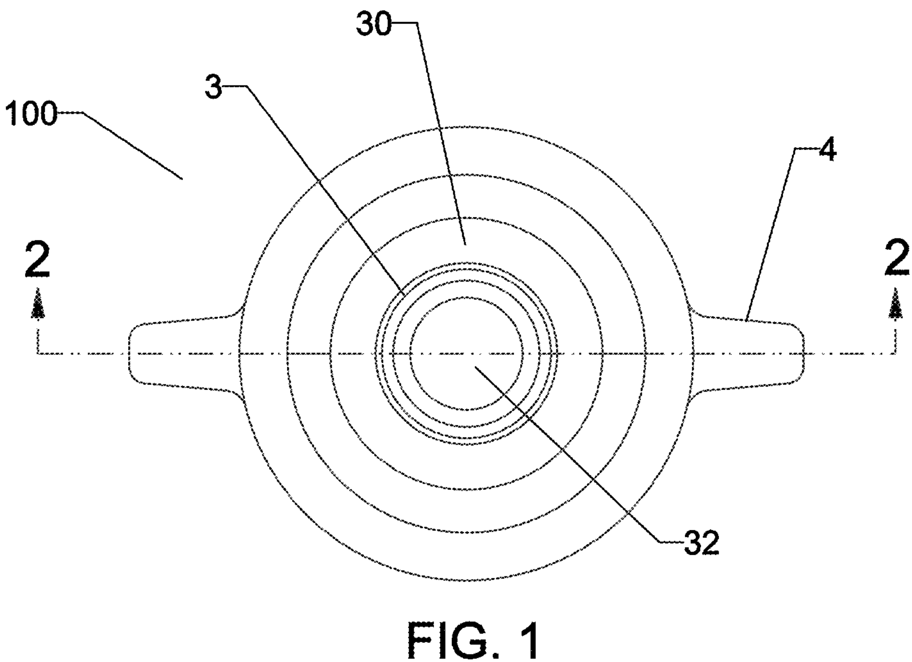
FIG. 1 shows an embodiment of the joint.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein. It should be noted that references to "an" or "one" embodiment in this disclosure are not necessarily to the same embodiment, and such references mean at least one.

Several definitions that apply throughout this disclosure will now be presented.

The term "coupled" is defined as connected, whether integral with, directly attached, or indirectly attached through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a joint 100 for an umbrella 6. However, it is to be understood that the joint 100 can be used for any suitable application.

FIG. 1 illustrates a top view of an embodiment of a joint 100. The joint 100 comprises an upper portion 3 comprising a spherical element 30. Some embodiments of the joint 100 will comprise a hanger 4.

Figure 2A:
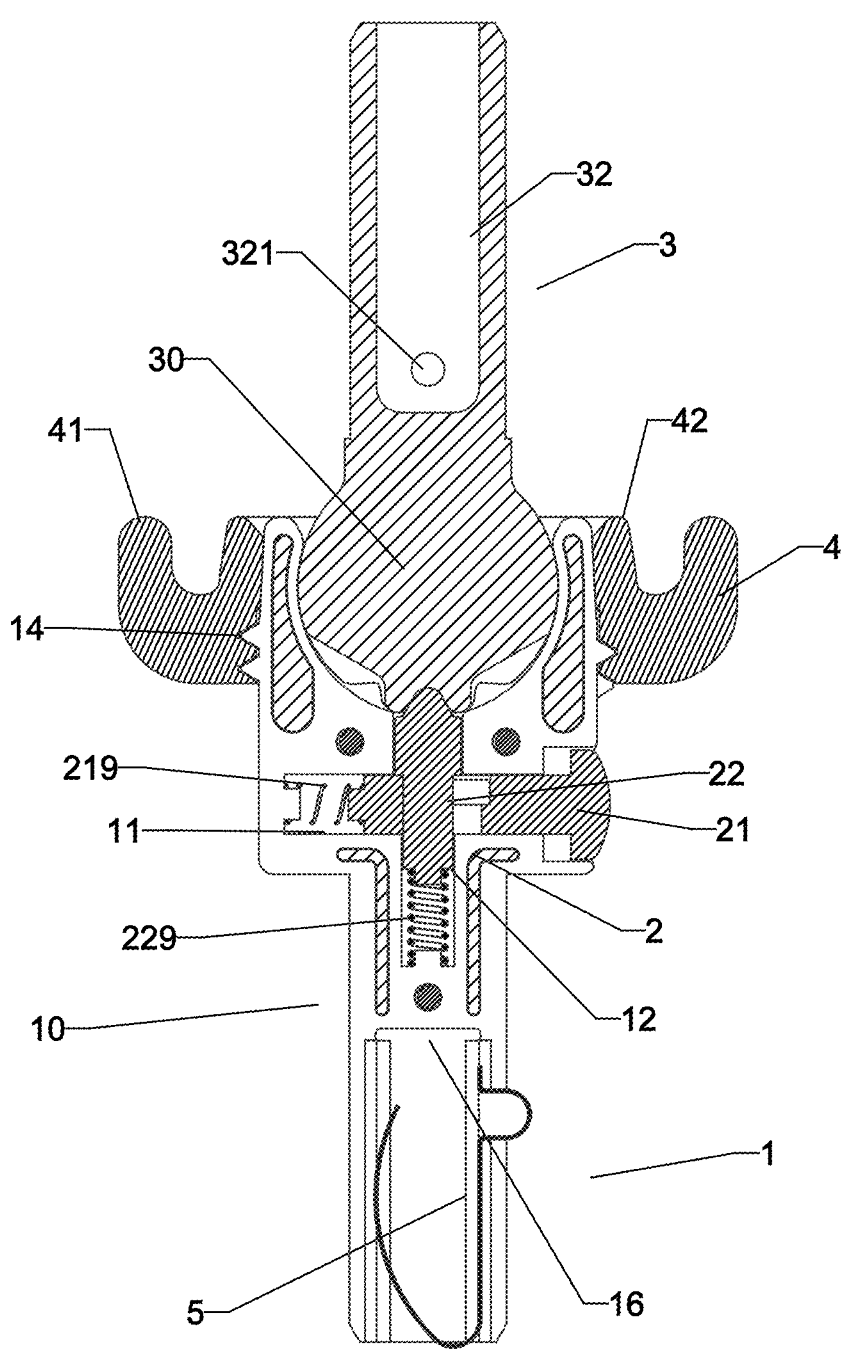
FIGS. 2*a*-2*c* shows a cross-section of an embodiment of the joint taken along line 2 in differing states.
Figure 2B:
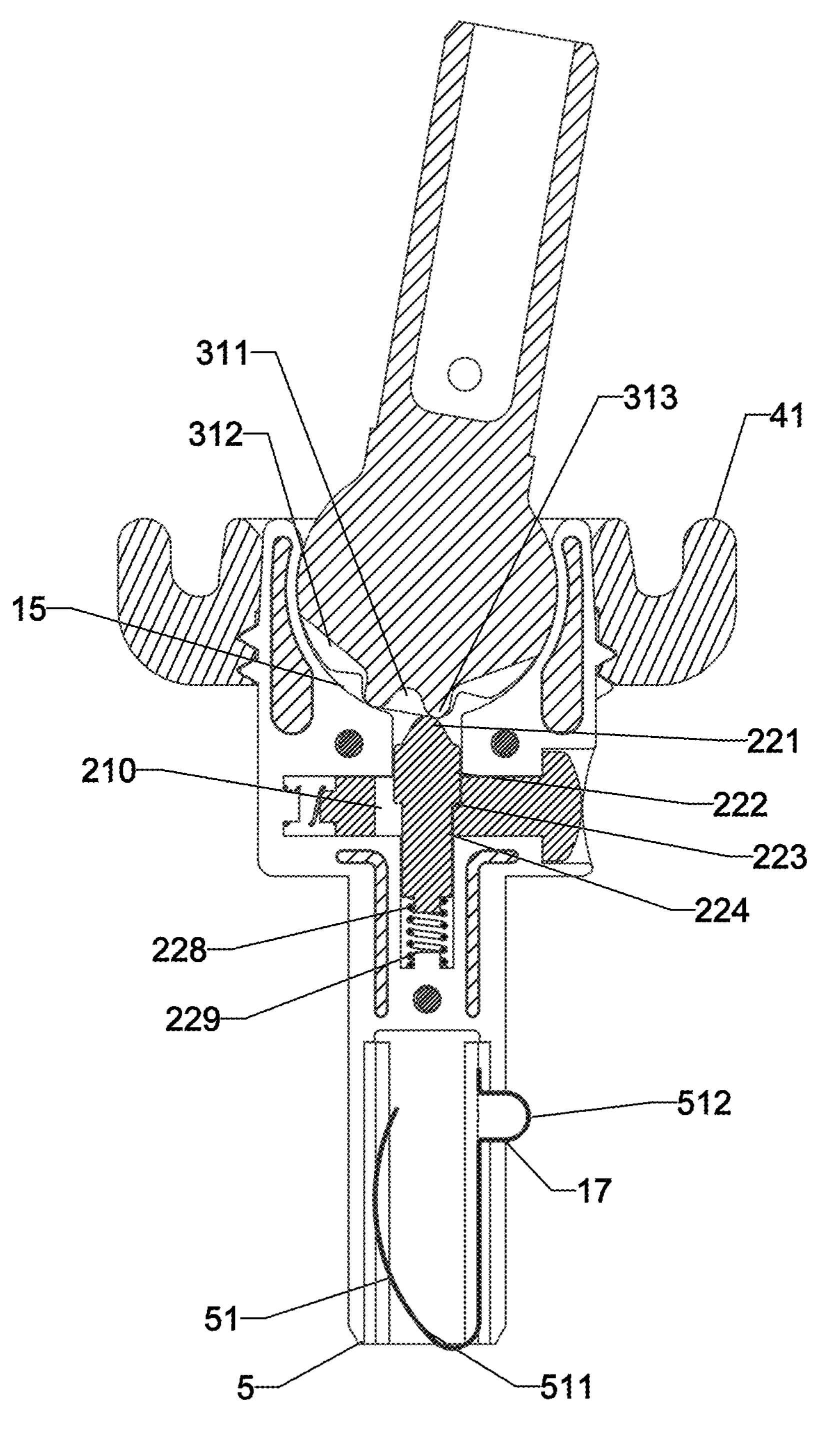
Figure 2C:
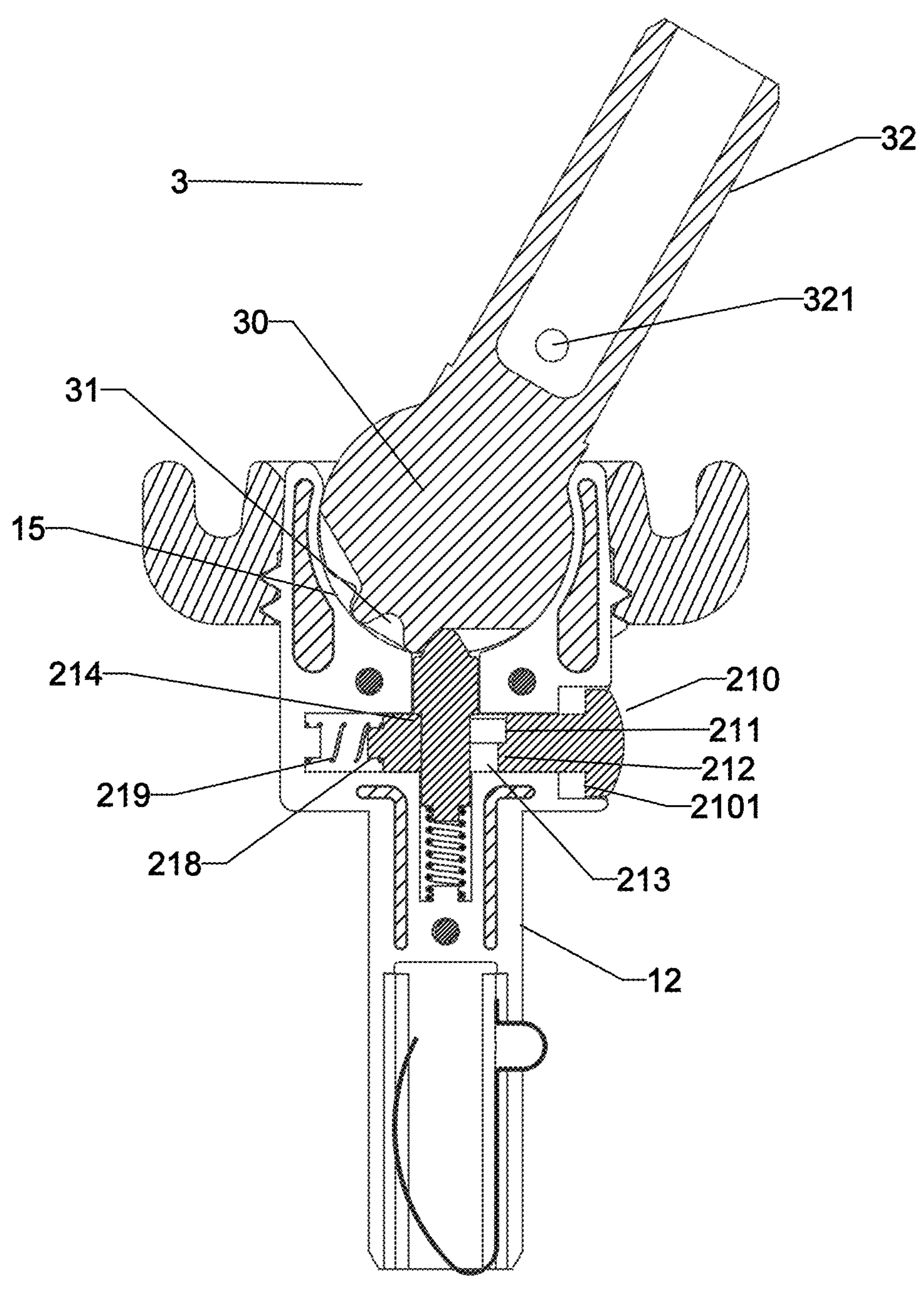

FIGS. 2*a*-2*c* illustrates a cross-section of an embodiment (taken along line 2) and operation of the joint 100. The joint 100 comprises an upper portion 3, an actuation portion 2, a base portion 1. The upper portion 3 comprises a spherical element 30. The base portion 1 comprises a lower member 10 and defines a socket 15 that accepts the spherical element 30. The actuation portion 2 comprises a button 21 and a pin 22. The button 21 can move between a locked position, where the pin 22 is prevented from linear movement in an actuation direction, and an actuation position, where the pin 22 is capable of at least some linear movement in the actuation direction. In some embodiments, the button 21 is set at an angle to the pin 22, and in some embodiments, the angle defined by the button 21 and the pin 22 is ninety degrees (90°).

In some embodiments, base portion 1 comprises an attachment connecting the base portion 1 to a base member 5. In some embodiments, the base portion 1 defines a base insertion space 16 in which a base member 5 can be inserted. In some embodiments, the base member is located outside the base portion 1. In some embodiments, the base member 5 comprises a securing member 51 that interacts with the base portion 1 to help secure the base portion 1 to the base member 5. In some embodiments, the securing member 51 comprises a protrusion 512 that extends through a base hole 17. In some embodiments, the securing member 51 further comprises a securing member spring 511 that biases the protrusion 512 through the base hole 17. In some embodiments, the base portion 1 and the base member 5 are integral. In some embodiments, the base member 5 comprises an insertion portion (not shown) to be inserted into a medium. In some embodiments, the insertion portion defines a point, a thread, or a combination thereof.

The base portion 1 defines a button space 11, in which the button 21 is able to actuate, and a pin space 12, in which the pin 22 is able to actuate.

The actuation portion 2, comprises a button 21 and a pin 22. In some embodiments, the actuation portion 2 comprises a button spring 219 that biases the button 21 to the locked position. In some embodiments, the actuation portion 2 comprises a pin spring 229 that biases the pin 22 into engagement with the spherical element 30. In some embodiments, the button 21 comprises a button head 210, a pin receiving space 213, a pin abutment shoulder 212, button locking ledge 214, pin shoulder space 211, button spring guide 218, or a combination thereof.

In some embodiments, the button head 210 can comprise a button head abutment 2101 that is able to limit the movement of the pin 22 when the button 21 is in the actuation position. In some embodiments, the button head abutment 2101 will abut the base portion 1 when in the actuation position.

In some embodiments, the pin receiving space 213 is defined by the actuation portion 2, and the pin body 224 extends therethrough. In some embodiments, the pin receiving space 213 comprises a first area 2132 and a second area 2131, and the second area 2131 is smaller than the first area 2132. In some embodiments, the second area 2131 is partially defined by the pin abutment shoulder 212 that extends into the pin receiving space 213.

In some embodiments, the pin 22 comprises a pin body 224, a pinhead 222, a pin projection 221, one or more pin flanges 223, pin spring engagement 228, or a combination thereof.

In some embodiments, the pin 22 and the pin body 224 are cylindrical. In some embodiments, the pin flange 223 is circular and extends around the entire pin 22. In some embodiments, there is more than one pin flange 223. In some embodiments, at least one pin flange 223 is configured to abut the pin abutment shoulder 212 in the actuation position, and at least one pin flange 223 is configured to abut the button locking ledge 214 when in the locked position.

In some embodiments, the pinhead 222 is configured to engage the locking grooves 312 and/or the locking center 311. In some embodiments, the pin projection 221 has a frusto-conical shape. In some embodiments, the pin projection 221 comprises a rounded tip. In some embodiments, one or more sections of the pin projection 221 and/or the locking portion 31 are made of, or coated with, a low friction material (e.g., PTFE) to allow ease of movement between the pin 22 and the spherical element 30.

In some embodiments, the upper portion 3 comprises an upper member 32. In some embodiments, the upper member 32 defines the upper member through-hole 321. In some embodiments, an umbrella 6 is coupled to the upper portion 3. In some embodiments, at least a portion of an umbrella pole 61 is located in the upper member 32. In some embodiments, the upper portion 3 and the umbrella 6 are integral.

In some embodiments, the spherical element 30 defines locking portion 31. In some embodiments, the locking portion 31 comprises a locking center 311 and two or more locking grooves 312. Increasing the number of locking grooves 312 can increase the number of preset rotation angle locations and decrease the rotation angle 319 between locking grooves 312. In some embodiments, the rotation angle 319 between the locking grooves 312 is consistent, and in other embodiments, the rotation angles 319 can vary. The rotation angles 319 can be predetermined as desired.

In some embodiments, when the button 21 is in the locked position, as shown in FIG. 2*a*, the actuation portion 2 is not actuated; the pin projection 221 is located in one of the locking grooves 312 or the locking center 311; a pin flange 223 is prevented from disengaging the locking groove 312 or locking center 311 sufficiently enough to allow for movement of the upper portion 3.

In some embodiments, when the button 21 is in the actuation position, the pin 22 is able to move until a pin flange 223 abuts pin abutment shoulder 212; and the spherical element 30 is able to move.

In some embodiments, the joint 100 is able to move between the locked position and the actuation position. In order to move from the locked position to the actuation position, a user presses the button head 210, which causes the button locking ledge 214 to disengage a pin flange 223. The pin 22 is able to move in relation to the base portion 1, and the spherical element 30 is able to move. When the spherical element 30 moves, at the direction of a user, the pin 22, biased by the pin spring 229, rides along the spherical element 30, in the locking portion 31 (which includes the locking center 311, the locking grooves 312, and the separators 313) until the approximate desired position is reached by the user. In order to move from the actuation position to the locked position, the user releases the button head 210 and the button spring 219 urges the button 21 to its locked position. The pin 22 is continuously biased against the spherical element 30, and when the button 21 is released, the pin 22 may or may not be fully engaged in the locking portion 31. If not fully engaged, in some embodiments, the button 21 will not move because the pinhead 222 prevents the button 21 from moving under the force of the button spring 219. It may be required for the user to make slight adjustments to the upper portion 3 so that the pin projection 221 can be fully extended into a locking portion 31, thus allowing the button 21 to fully actuate under the force of the button spring 219. This will place the button locking ledge 214 in alignment with a pin flange 223 and secure the pin 22 in the locked position.

In some embodiments, the hanger 4 comprises a hook 41 and a body 42. In some embodiments, the hanger 4 can be used to tighten a top part of the socket 15 so as to better secure the spherical element 30 therein. In some embodiments, the hanger 4 has a diameter that decreases, such that further the further down the hanger 4 is secured to the base portion 1, the tighter the socket 15. In some embodiments, the hanger 4 is in threaded engagement with the base portion 1, and the more the hanger 4 is twisted, the tighter the engagement and the more the socket 15 is compressed.

The base portion 1 defines a base axis that extends linearly along the length of the base portion 1. The upper portion 3 defines an upper portion axis that extends linearly along the length of the upper portion 3. The upper portion 3 is configured to move between a straight position (as seen in FIG. 2*a*) and a slanted position (as seen in FIGS. 2*b* and 2*c*). In the straight position, the base axis and the upper portion axis are substantially aligned. In the slanted position, the upper portion axis is at a slant angle in relation to the base angle. It is understood that in some embodiments, the axes may not actually intercept, but the slant angle can be defined by looking at the profile of the joint 100. In some embodiments, when in the slanted position, the upper member 32 will abut the base portion 1 (as seen in FIG. 2*c*), and in some embodiments, when in the slanted position, the upper member 32 will not abut the base portion 1.

Figure 3:
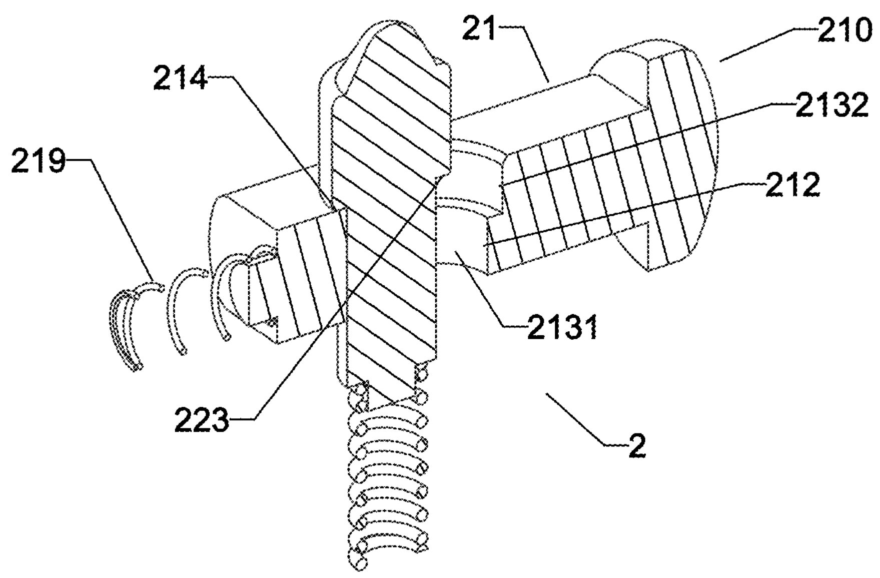
FIG. 3 shows an embodiment of an actuation portion in a locked position.

FIG. 3 shows an embodiment of actuation portion 2 in the locked position. In the locked position, the pin flange 223 abuts the button locking ledge 214, preventing the pin 22 from moving downward and out of engagement with the locking portion 31.

Figure 4:
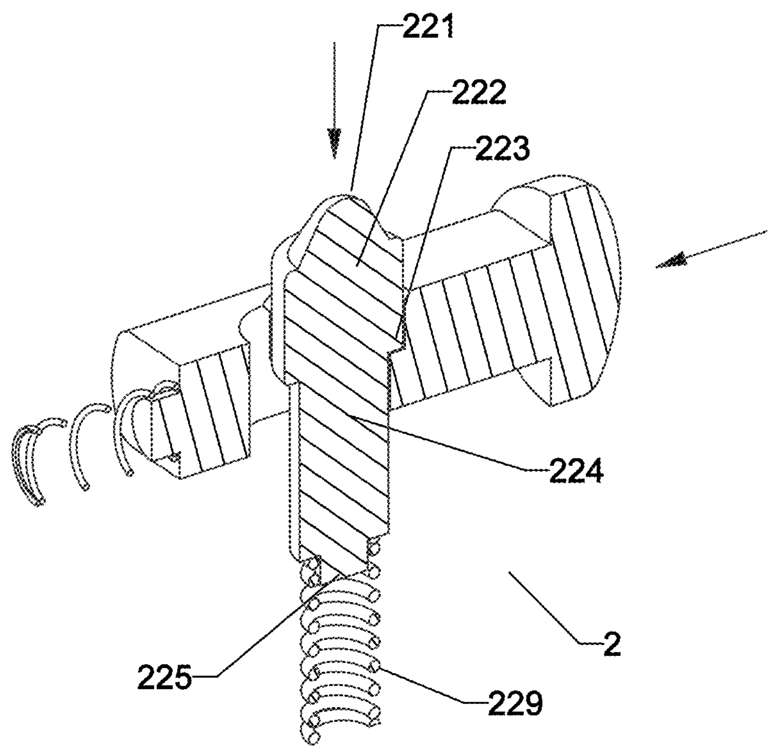
FIG. 4 shows an embodiment of an actuation portion in an actuation position.
Figure 5:
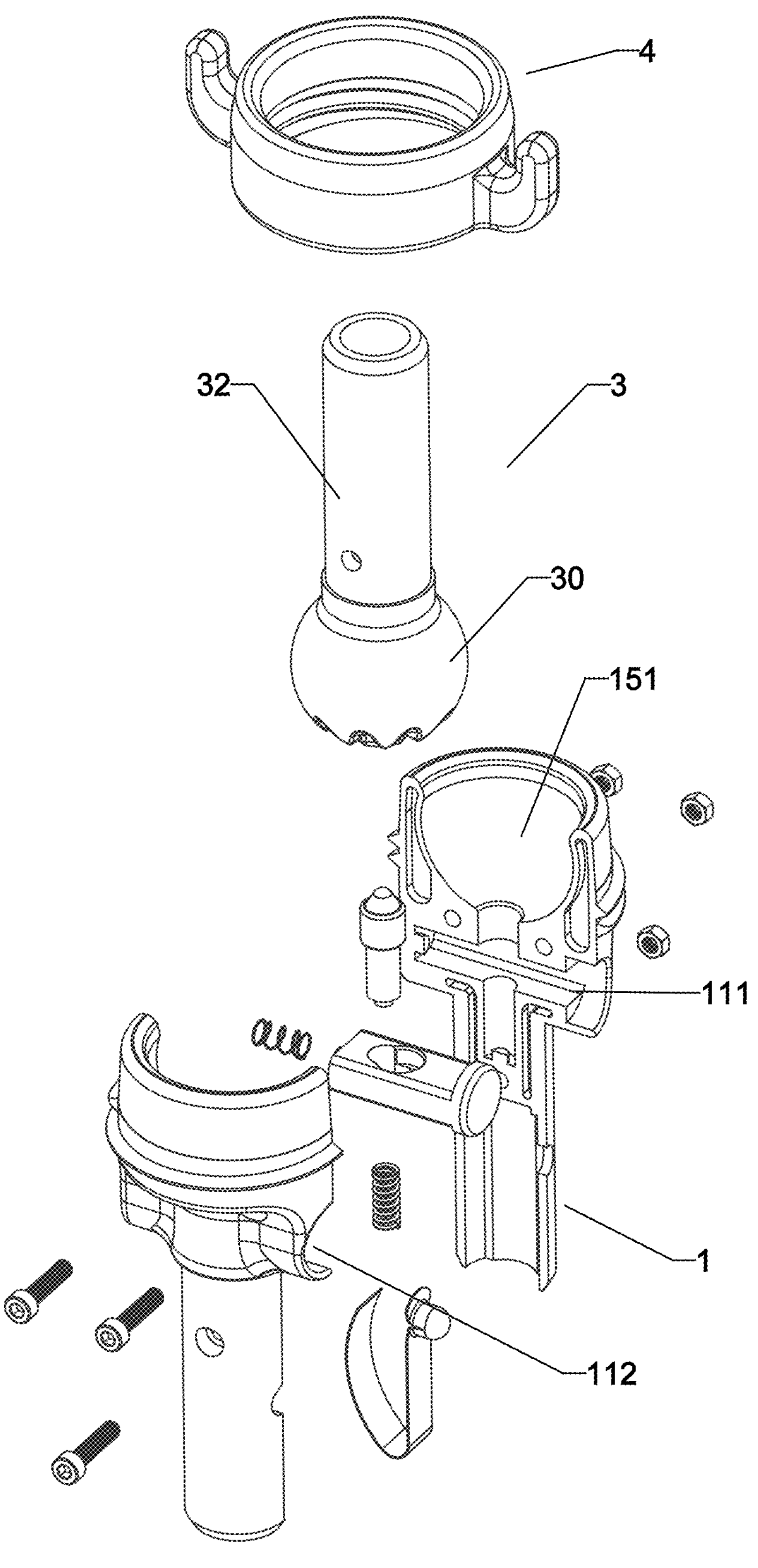
FIGS. 5 and 6 shows an embodiment of the joint in an exploded views.
Figure 6:
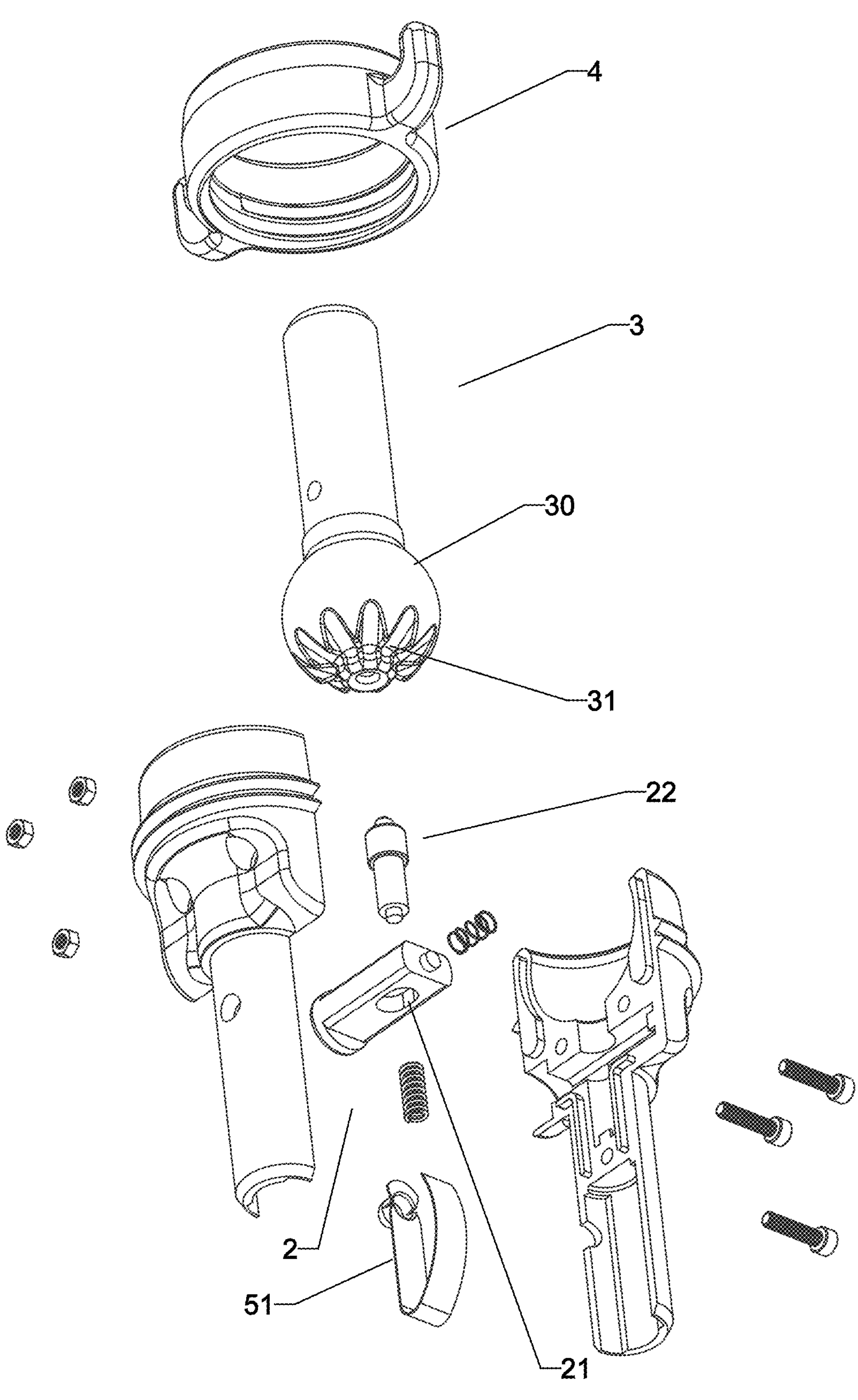

FIG. 4 shows the same embodiment of the actuation portion 2 as FIG. 3 but in the actuation position. In the actuation position, the button 21 has been actuated so that the pin flange 223 is out of alignment with the button locking ledge 214 and free to move downward in response to the movement of the spherical element 30. In some embodiments, the button 21 comprises a pin abutment shoulder 212, and the pin 22 has a corresponding pin flange 223, or section thereof, that interacts to limit the amount of downward movement of the pin 22. FIGS. 5 and 6 shows different exploded views of an embodiment of the joint 100.

Figure 7:
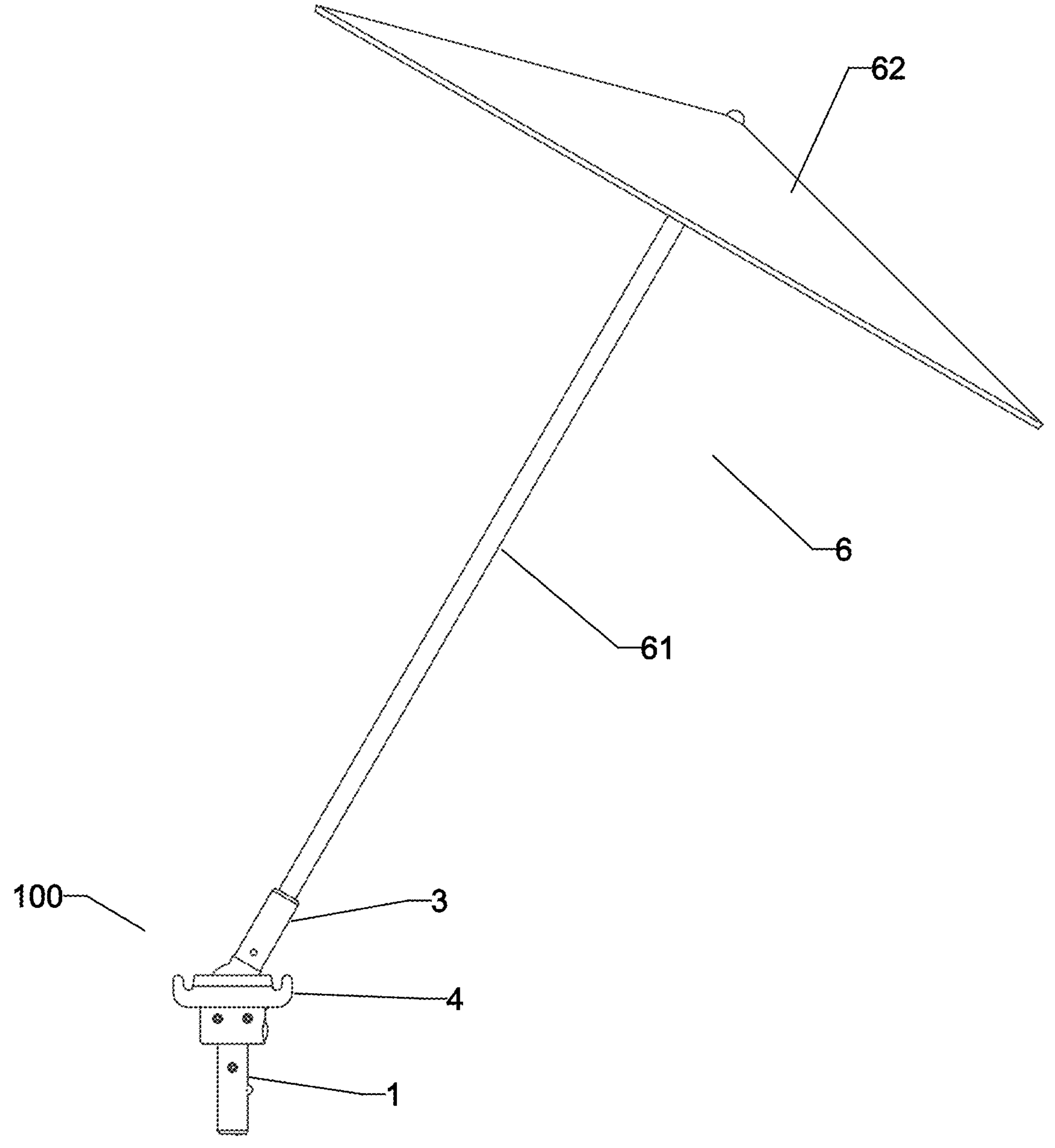
FIG. 7 shows an embodiment of the joint with an umbrella.

FIG. 7 shows an embodiment of a joint 100 with an umbrella 6 attached. In some embodiments, a base member 5 extends from the base portion 1. The securing member 51 is inserted into upper member 32. It is understood that in other embodiments, the securing member 51 can be slid over the upper member 32. In some embodiments, the umbrella 6 is integral with the upper portion 3.

Figure 8:
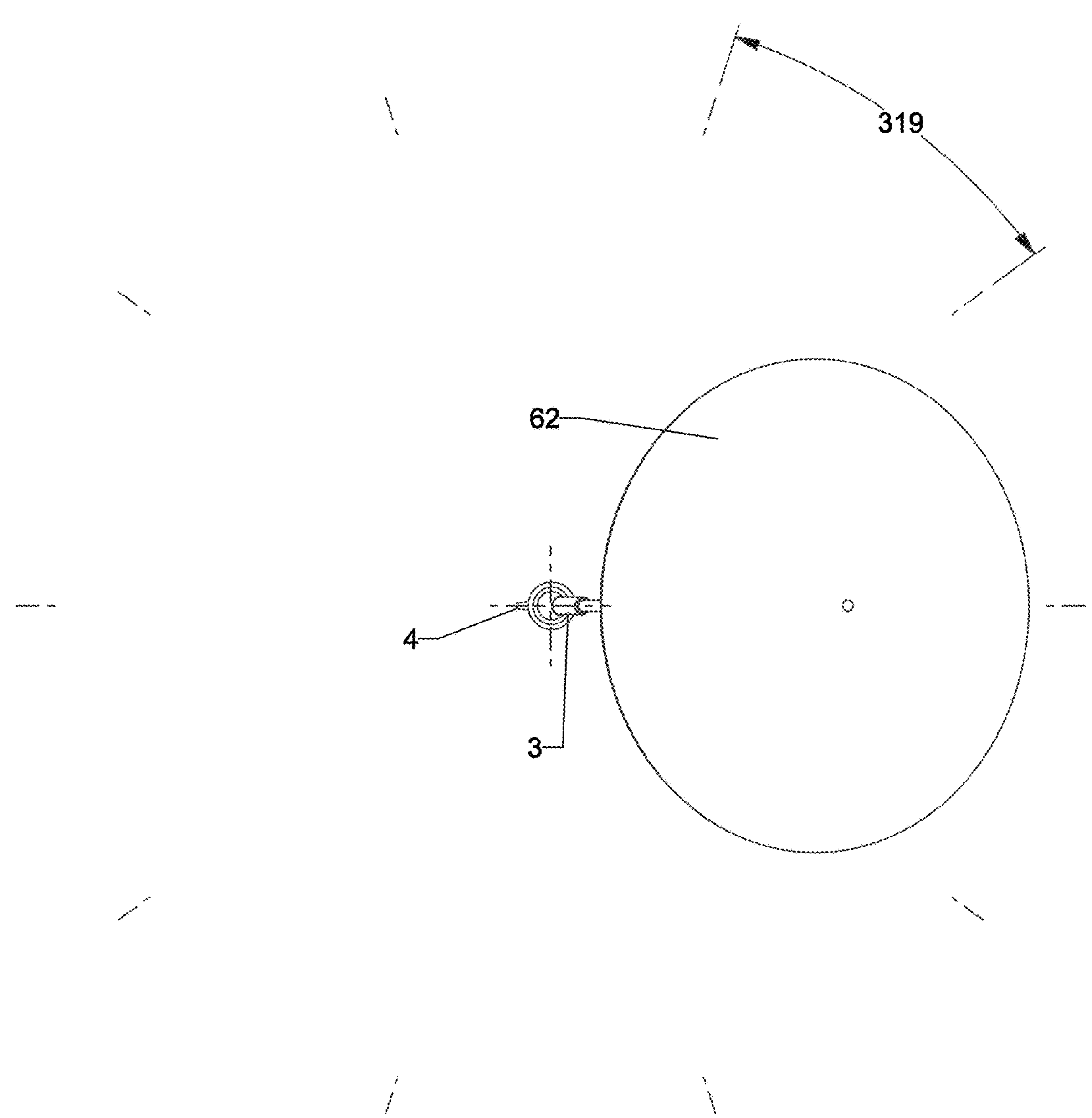
FIG. 8 shows an embodiment of the joint with an umbrella and some rotation angles.

FIG. 8 shows an embodiment of the joint 100 with an umbrella 6. The umbrella comprises a folding umbrella canopy 62. As shown in the figure, the available positions of the umbrella 6 are separated by rotation angles 319. The rotation angles 319 are the same in some embodiments, and in some other embodiments, they differ. Thus the umbrella canopy 62 will also be adjustable to the rotation angles 319. In some embodiment, the number of positions, and the number of rotation angles 319, can be predetermined by adjusting the number of locking grooves 312. As seen, in the slanted position, the upper member 32 can rotate around the base portion axis 360° in some embodiments and less in other embodiments. In some embodiments, the upper portion 3 is able to rotate even while in the straight position.

Figure 9:
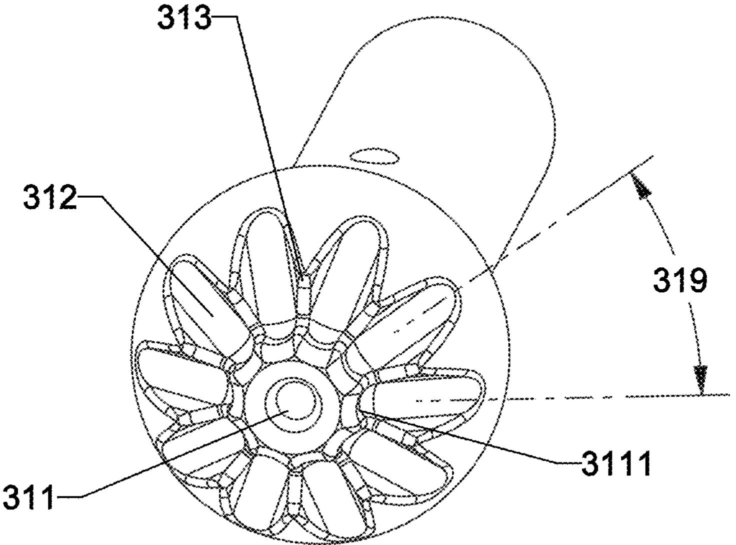
FIG. 9 shows an embodiment of the spherical element.

FIG. 9 shows an embodiment of spherical element 30 with the locking grooves 312 defining the rotation angles 319. The separators 313 and the locking center 311 are also shown. Some embodiments comprise a center extension 3111 that allows for easier positioning and/or locking of the locking center 311.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

It should also be noted that elements of embodiments may be described in reference to the description of a particular embodiment; however it is disclosed that elements of disclosed embodiments can be switched with corresponding elements of embodiments with the same name and/or number of other disclosed embodiments. Further while some elements have been described with terms indicating orientation (e.g. down), they are only used as a means describing the disclosure and the terms do not require the orientation.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An apparatus comprising:

a joint comprising:

a base portion defining a socket;

an upper portion comprising a spherical element that is at least partially located inside the socket; wherein the spherical element defines a locking portion; and an actuation portion at least partially located inside the base portion; wherein the actuation portion comprises a button, a button spring, a pin, a pin spring; the button defines a pin receiving space; the pin comprises a pin projection; the pin extends through the pin receiving space; the button is configured to move between a locked position and an actuation position; the button spring biases the button to the locked position; and the pin spring biases the pin toward the spherical element, and into abutment with the locking portion;

wherein in the actuation position, the upper portion is able to move within the socket while the pin projection abuts the spherical element, and the pin is able to move in an actuation direction; and in the locked position, the button prevents the pin from moving in the actuation direction and the pin projection is located inside the locking portion.

2. The apparatus of claim 1, wherein the locking portion defines two or more locking grooves and a locking center, when the pin projection is located in the locking center, the upper portion is aligned with the base portion; and when the pin projection is located in one of the two or more locking grooves, the upper portion is not aligned with the base portion.

3. The apparatus of claim 2, wherein the two or more locking grooves define a rotation angle therebetween.

4. The apparatus of claim 3, wherein the rotation angle is consistent between all of the two or more locking grooves.

5. The apparatus of claim 1, wherein the button comprises a pin abutment shoulder; and in the actuation position, the pin abutment shoulder limits movement of the pin along the actuation direction.

6. The apparatus of claim 1, wherein the button comprises a button locking ledge; and in the locked position, the button locking ledge prevents movement along the actuation direction and keeps the pin projection inside the locking portion.

7. The apparatus of claim 1, wherein the button comprises a button head, and wherein the button head is pressed against the button spring to move from the locked position to the actuation position.

8. The apparatus of claim 1, wherein the pin and the button are substantially perpendicular to each other.

9. The apparatus of claim 1, further comprising a folding umbrella canopy and a base member, and the joint is located between the folding umbrella canopy and the base member.

10. The apparatus of claim 1, further comprising a hanger threadedly engaged to the base portion.

11. An apparatus comprising:

a joint comprising:

a base portion defining a socket and a base portion axis;

an upper portion comprising a spherical element, located in the socket, and defining an upper portion axis; and an actuation portion configured to move between a locked position and an actuation position;

wherein the upper portion is able to move between a straight position, in which the upper portion axis and the base portion axis are substantially aligned, and a slanted position, in which the upper portion axis is at a slant angle in relation to the base portion axis; when in both the slanted position and the actuation position, the upper portion is able to rotate about the base portion axis; the spherical element comprises a locking portion; the actuation portion at least partially located inside the base portion; the actuation portion comprises a button, a button spring, a pin, a pin spring; the button defines a pin receiving space; the pin comprises a pin projection; the pin extends through the pin receiving space; the button is configured to move between the locked position, in which the pin is prevented from moving in an actuation direction, and the actuation position, in which the pin is capable of at least some movement in the actuation direction; the button spring biases the button to the locked position; and the pin spring biases the pin toward the spherical element and into abutment with the locking portion.

12. The apparatus of claim 11, wherein when in the slanted position and the actuation position, the upper portion is able to rotate three hundred and sixty degrees (360°) about the base portion axis.

13. The apparatus of claim 11, wherein in the actuation position, the upper portion is able to move within the socket while the pin projection abuts the spherical element, and the pin is able to move in the actuation direction; and in the locked position, the button prevents the pin from moving in the actuation direction and the pin projection is located inside the locking portion.

14. The apparatus of claim 11, wherein the upper portion further comprises an upper member extending from the spherical element, and in the slanted position, the upper member abuts the base portion.

15. The apparatus of claim 11, wherein the locking portion defines two or more locking grooves and a locking center; when in the straight position the pin projection is located in the locking center; and when in the slanted position the pin projection is located in the locking grooves.

16. The apparatus of claim 11, wherein the button comprises a button locking ledge; and in the locked position, the button locking ledge prevents movement along the actuation direction and keeps the pin projection inside the locking portion.

* * * * *